United States Patent
Micaelian et al.

(10) Patent No.: US 8,620,717 B1
(45) Date of Patent: Dec. 31, 2013

(54) ANALYTICAL TOOL

(75) Inventors: Fadi Victor Micaelian, Menlo Park, CA (US); Emil Mario Scoffone, Menlo Park, CA (US)

(73) Assignee: Auguri Corporation, Menlo Park, CA (US)

( * ) Notice: Subject to any disclaimer, the term of this patent is extended or adjusted under 35 U.S.C. 154(b) by 2355 days.

(21) Appl. No.: 10/981,988

(22) Filed: Nov. 4, 2004

(51) Int. Cl.
 *G06Q 10/00* (2012.01)

(52) U.S. Cl.
 USPC .................. 705/7.29; 705/7.11; 705/7.33

(58) Field of Classification Search
 USPC .................. 707/706–735; 705/7.11–7.42
 See application file for complete search history.

(56) References Cited

U.S. PATENT DOCUMENTS

| | | | |
|---|---|---|---|
| 4,839,822 A | | 6/1989 | Dormond et al. |
| 4,996,642 A | * | 2/1991 | Hey .............................. 705/7.29 |
| 5,041,972 A | * | 8/1991 | Frost ................................. 705/10 |
| 5,237,496 A | * | 8/1993 | Kagami et al. ............... 705/7.31 |
| 5,297,239 A | | 3/1994 | Kurosawa et al. |
| 5,305,199 A | * | 4/1994 | LoBiondo et al. ............... 705/28 |
| 5,321,833 A | * | 6/1994 | Chang et al. ........................... 1/1 |
| 5,552,995 A | | 9/1996 | Sebastian |
| 5,684,704 A | | 11/1997 | Okazaki |
| 5,712,989 A | * | 1/1998 | Johnson et al. ................. 705/28 |
| 5,715,444 A | * | 2/1998 | Danish et al. ......................... 1/1 |
| 5,717,865 A | * | 2/1998 | Stratmann ....................... 705/10 |
| 5,734,890 A | * | 3/1998 | Case et al. ............................. 1/1 |
| 5,765,143 A | * | 6/1998 | Sheldon et al. ................. 705/28 |
| 5,819,245 A | * | 10/1998 | Peterson et al. ................ 706/16 |
| 5,826,260 A | | 10/1998 | Byrd et al. |
| 5,835,087 A | * | 11/1998 | Herz et al. ..................... 715/810 |
| 5,867,799 A | * | 2/1999 | Lang et al. ............................. 1/1 |
| 5,884,282 A | * | 3/1999 | Robinson ..................... 705/7.33 |
| 5,899,991 A | | 5/1999 | Karch |
| 5,903,892 A | * | 5/1999 | Hoffert et al. ......................... 1/1 |
| 5,909,023 A | * | 6/1999 | Ono et al. ...................... 235/380 |
| 5,918,014 A | * | 6/1999 | Robinson ...................... 709/219 |
| 5,918,223 A | * | 6/1999 | Blum et al. ............................ 1/1 |
| 5,933,818 A | | 8/1999 | Kasravi et al. |
| 5,960,414 A | * | 9/1999 | Rand et al. ....................... 705/28 |
| 5,960,422 A | | 9/1999 | Prasad |
| 5,963,920 A | * | 10/1999 | Rose et al. ....................... 705/28 |
| 5,963,939 A | | 10/1999 | McCann et al. |
| 5,963,948 A | * | 10/1999 | Shilcrat .................... 340/995.19 |
| 5,963,951 A | | 10/1999 | Collins |
| 5,966,126 A | | 10/1999 | Szabo |
| 5,970,482 A | | 10/1999 | Pham et al. |
| 5,983,220 A | * | 11/1999 | Schmitt ................................ 1/1 |
| 5,983,237 A | | 11/1999 | Jain et al. |

(Continued)

OTHER PUBLICATIONS

McCullough, Dick "Trade-off Analysis: A survey of Commercially Available Techniques" iMacro, Mar. 3, 2000, http://web.archive.org/web/20000303153932/http://www.macroinc.com/html/art/s_tra2.html.*

(Continued)

*Primary Examiner* — Alan S Miller

(57) ABSTRACT

An exemplary method for determining a singular impact of a base criterion includes selecting the base criterion and a trade criterion from a plurality of criteria and selecting a starting alternative and a target alternative. A series of virtual alternatives are then created, initially based on the starting alternative, by sequentially eliminating an impact of each non-selected criteria from the plurality of criteria. A final virtual alternative is compared to the target alternative and the singular impact of the base criterion is determined based on a difference between the final virtual alternative and the target alternative.

35 Claims, 8 Drawing Sheets

(56) References Cited

U.S. PATENT DOCUMENTS

| | | | |
|---|---|---|---|
| 6,009,407 A * | 12/1999 | Garg | 705/7.25 |
| 6,012,051 A * | 1/2000 | Sammon et al. | 706/52 |
| 6,018,738 A * | 1/2000 | Breese et al. | 707/749 |
| 6,035,284 A * | 3/2000 | Straub et al. | 705/28 |
| 6,049,777 A * | 4/2000 | Sheena et al. | 705/10 |
| 6,052,122 A | 4/2000 | Sutcliffe et al. | |
| 6,055,519 A * | 4/2000 | Kennedy et al. | 705/80 |
| 6,064,980 A * | 5/2000 | Jacobi et al. | 705/26.7 |
| 6,167,380 A * | 12/2000 | Kennedy et al. | 705/7.31 |
| 6,178,406 B1 | 1/2001 | Cheetham et al. | |
| 6,195,643 B1 * | 2/2001 | Maxwell | 705/7.32 |
| 6,195,652 B1 * | 2/2001 | Fish | 1/1 |
| 6,249,774 B1 * | 6/2001 | Roden et al. | 705/28 |
| 6,266,649 B1 * | 7/2001 | Linden et al. | 705/26 |
| 6,266,652 B1 * | 7/2001 | Godin et al. | 705/37 |
| 6,266,668 B1 | 7/2001 | Vanderveldt et al. | |
| 6,269,303 B1 | 7/2001 | Watanabe et al. | |
| 6,272,467 B1 | 8/2001 | Durand et al. | |
| 6,286,005 B1 * | 9/2001 | Cannon | 705/14.66 |
| 6,321,133 B1 * | 11/2001 | Smirnov et al. | 700/100 |
| 6,324,522 B2 * | 11/2001 | Peterson et al. | 705/28 |
| 6,327,574 B1 | 12/2001 | Kramer et al. | |
| 6,353,822 B1 | 3/2002 | Lieberman | |
| 6,360,227 B1 * | 3/2002 | Aggarwal et al. | 1/1 |
| 6,370,513 B1 * | 4/2002 | Kolawa et al. | 705/7.33 |
| 6,397,212 B1 * | 5/2002 | Biffar | 1/1 |
| 6,438,579 B1 | 8/2002 | Hosken | |
| 6,442,537 B1 | 8/2002 | Karch | |
| 6,457,052 B1 | 9/2002 | Markowitz et al. | |
| 6,463,428 B1 | 10/2002 | Lee et al. | |
| 6,473,751 B1 | 10/2002 | Nikolovska et al. | |
| 6,499,029 B1 | 12/2002 | Kurapati et al. | |
| 6,510,417 B1 | 1/2003 | Woods et al. | |
| 6,523,026 B1 * | 2/2003 | Gillis | 1/1 |
| 6,529,877 B1 * | 3/2003 | Murphy et al. | 705/7.22 |
| 6,546,388 B1 | 4/2003 | Edlund et al. | |
| 6,549,897 B1 | 4/2003 | Katariya et al. | |
| 6,556,985 B1 | 4/2003 | Karch | |
| 6,578,022 B1 | 6/2003 | Foulger et al. | |
| 6,584,471 B1 | 6/2003 | Maclin et al. | |
| 6,609,108 B1 | 8/2003 | Pulliam et al. | |
| 6,701,311 B2 | 3/2004 | Biebesheimer et al. | |
| 6,714,929 B1 * | 3/2004 | Micaelian et al. | 1/1 |
| 6,732,088 B1 | 5/2004 | Glance | |
| 6,748,484 B1 | 6/2004 | Henderson et al. | |
| 6,826,541 B1 * | 11/2004 | Johnston et al. | 705/36 R |
| 6,895,388 B1 * | 5/2005 | Smith | 705/26 |
| 6,973,418 B1 * | 12/2005 | Kirshenbaum | 703/2 |
| 7,016,882 B2 * | 3/2006 | Afeyan et al. | 706/13 |
| 7,103,561 B1 * | 9/2006 | Sarkisian et al. | 705/10 |
| 7,117,163 B1 * | 10/2006 | Iyer et al. | 705/10 |
| 7,191,143 B2 * | 3/2007 | Keli et al. | 705/10 |
| 7,562,063 B1 * | 7/2009 | Chaturvedi | 706/50 |
| 7,596,505 B2 * | 9/2009 | Keil et al. | 705/10 |
| 2001/0010041 A1 * | 7/2001 | Harshaw | 705/10 |
| 2001/0029183 A1 | 10/2001 | Ito | |
| 2001/0054054 A1 | 12/2001 | Olson | |
| 2002/0004739 A1 * | 1/2002 | Elmer et al. | 705/10 |
| 2002/0004757 A1 | 1/2002 | Torres et al. | |
| 2002/0013721 A1 * | 1/2002 | Dabbiere et al. | 705/7 |
| 2002/0019761 A1 * | 2/2002 | Lidow | 705/10 |
| 2002/0024532 A1 | 2/2002 | Fables et al. | |
| 2002/0032638 A1 | 3/2002 | Arora et al. | |
| 2002/0042786 A1 * | 4/2002 | Scarborough et al. | |
| 2002/0055900 A1 | 5/2002 | Kansal | |
| 2002/0059228 A1 | 5/2002 | McCall et al. | |
| 2002/0087388 A1 * | 7/2002 | Keil et al. | 705/10 |
| 2002/0103792 A1 | 8/2002 | Blank et al. | |
| 2002/0107852 A1 * | 8/2002 | Oblinger | 707/5 |
| 2002/0111780 A1 * | 8/2002 | Sy | 703/2 |
| 2002/0129014 A1 | 9/2002 | Kim et al. | |
| 2002/0138399 A1 | 9/2002 | Hayes et al. | |
| 2002/0138456 A1 | 9/2002 | Levy et al. | |
| 2002/0138481 A1 | 9/2002 | Aggarwal et al. | |
| 2002/0173978 A1 | 11/2002 | Boies et al. | |
| 2002/0191954 A1 | 12/2002 | Beach et al. | |
| 2003/0014326 A1 | 1/2003 | Ben-Meir et al. | |
| 2003/0014428 A1 | 1/2003 | Mascarenhas | |
| 2003/0018517 A1 * | 1/2003 | Dull et al. | 705/10 |
| 2003/0037041 A1 * | 2/2003 | Hertz | 707/1 |
| 2003/0040952 A1 * | 2/2003 | Keil et al. | 705/10 |
| 2003/0061201 A1 | 3/2003 | Grefenstette et al. | |
| 2003/0061202 A1 | 3/2003 | Coleman | |
| 2003/0061214 A1 | 3/2003 | Alpha | |
| 2003/0061242 A1 | 3/2003 | Warmer et al. | |
| 2003/0101286 A1 | 5/2003 | Kolluri et al. | |
| 2003/0217052 A1 | 11/2003 | Rubenczyk et al. | |
| 2004/0225651 A1 * | 11/2004 | Musgrove et al. | 707/4 |
| 2005/0004880 A1 * | 1/2005 | Musgrove et al. | 705/400 |
| 2006/0026081 A1 * | 2/2006 | Keil et al. | 705/27 |

OTHER PUBLICATIONS

Exhibits A and B are exemplary screen shots of an example Decision Support System ("DSS") that was sold in 1995 to the software distributor MacZone in the United States.

User Manual for the product "Auguri Triple C," that was sold in 1995 to the software distributor MacZone in the United States.

Kiebling, Werner, "Foundations of Preferences in Database Systems", 2002 VLDB conference http://222.cs.ust.hk/vldb2002/program-info/research.html (PDF Presentation Slides—2.9 MB) University of Augsburg, Germany.

Kossmann, Donald et al., "Shooting Stars in the Sky: An Online Algorithm for Skyline Queries", 2002 VLDB conference http://222.cs.ust.hk/vldb2002/program-info/research.html (PDF Presentation Slides—83 MB) Technische Universitat Munchen, Germany.

* cited by examiner

FIG. 1

Auguri2000 Decision Engine

Use this screen to tell us what you care about in your new car and we'll then tell you what cars we think you should consider.

On the left indicate how much you care about a feature by adjusting the side controls. For example if you care a lot about safety and price then set the slider each to the extreme right. Remember you're saying you care a lot about price, not that you're willing to pay a lot of money! When you're ready hit the Analyze and our SmartSearch engine will return a list of appropriate vehicles for your consideration.

| Specify Importance | Not Important | | Very Important |
|---|---|---|---|
| Space | | | |
| Performance | | | |
| Safety | | | |
| Gas Mileage | | | |
| Maintenance Costs | | | |
| Comfort | | | |
| Price | | | |

Process

| Vehicle Ranking | | | |
|---|---|---|---|
| Rank | Vehicle | Score | Talk To Us Now |
| 1 | Ford Focus ZX3 Coupe | 66% | Talk Now |
| 2 | Ford Escape TWD Sport Utility 4D | 60% | Talk Now |
| 3 | Ford Taurus SE-V6 Wagon 4D | 54% | Talk Now |
| 4 | Ford Mustang V6 (3.8 Liter) Deluxe Coupe 2D | 50% | Talk Now |
| 5 | Ford Escort ZX2 Coupe | 49% | Talk Now |

ANALYTICAL TOOL

CROSS REFERENCE TO RELATED APPLICATIONS

This application is related to U.S. Pat. No. 6,714,929 and U.S. patent application Ser. No. 09/962,708 both of which are incorporated herein by reference.

DESCRIPTION OF THE RELATED ART

There are numerous data analysis techniques that are employed by organizations to determine various items such as customer needs, preferences and tradeoffs. These techniques include business intelligence, data mining, marketing analytics and knowledge management/reporting tools. Typically these techniques are based on historical data and therefore are typically inadequate in predicting behavior on new products or markets where historical data is not available.

Specifically, these techniques are most likely not capable of predicting how much a customer is willing to pay for a feature or product, to tradeoff certain features, forecast the impact of a change in a product and predicting which feature would most enhance a product.

It should be understood that there is a distinction between the cost of an option and the perceived value to a consumer of having that option. For example, it may cost a certain amount of money to a manufacturer to include an option on a product. The figure that a consumer is willing to pay for that option is different and is difficult to determine. Similarly, a consumer may place a premium on a certain grouping of options. Determining that optimal combination can be difficult as well.

In view of the foregoing, it may be useful to provide methods and systems that analyze a singular impact of a tradeoff or a singular impact of a group of tradeoffs.

SUMMARY OF EMBODIMENTS OF THE INVENTION

The present invention is described and illustrated in conjunction with systems, apparatuses and methods of varying scope which are meant to be exemplary and illustrative, not limiting in scope.

A method for determining a singular impact of a base criterion, in accordance with an exemplary embodiment, includes selecting the base criterion and a trade criterion from a plurality of criteria and selecting a starting alternative and a target alternative. A series of virtual alternatives are then created, initially based on the starting alternative, by sequentially eliminating an impact of each non-selected criteria from the plurality of criteria. A final virtual alternative is compared to the target alternative and the singular impact of the base criterion is determined based on a difference between the final virtual alternative and the target alternative.

A method for determining a singular impact of a base criterion, in accordance with another exemplary embodiment, includes selecting the base criterion and a trade criterion from a plurality of criteria. A starting alternative and a target alternative are also selected and a series of virtual alternatives are created, initially based on the starting alternative, by sequentially eliminating an impact of each non-selected criteria from the plurality of criteria. A virtual alternative of the series of virtual alternatives is compared to the target alternative wherein the virtual alternative only differs from the target alternative by a value of the base criterion. The singular impact of the base criterion is then determined based on a difference between the final virtual alternative and the target alternative.

A method for determining a singular impact of a base criterion, in accordance with yet another exemplary embodiment, includes selecting the base criterion and a trade criterion from "N" criteria. A starting alternative and a target alternative are also selected and "N−2" sequential virtual alternatives are created, initially based on the starting alternative, by sequentially eliminating an impact of each non-selected criteria from the "N" criteria. A virtual alternative of the series of virtual alternatives is compared to the target alternative wherein the virtual alternative only differs from the target alternative by a value of the base criterion. The singular impact of the base criterion is then determined based on a difference between the final virtual alternative and the target alternative.

A method for analyzing an impact of a desired singular tradeoff for a population of users, in accordance with yet another exemplary embodiment, includes selecting the desired singular tradeoff from the population of users and collecting a plurality of singular tradeoffs in a sequential fashion from the population of users. The plurality of tradeoffs are then processed and analyzed to determine the impact of the desired singular tradeoff.

A system for determining a singular impact of a base criterion, in accordance with another exemplary embodiment, includes a singular tradeoff engine that accepts a weighted ordered list and operative to determine a singular impact of a base criterion by creating virtual alternatives based on the weighted ordered list. Also included is a function subroutine engine that accepts parametric values from the singular tradeoff engine and operative to develop a new value to the singular tradeoff engine.

A method for determining a value a consumer places on a desired product component, in accordance with an exemplary embodiment, includes providing a first product without the desired product component and a second product with the desired product component. A series of simulated products are then created, initially based on the first product, by sequentially eliminating an impact of each non-desired product component. A final simulated product is compared to the second product; and the value is determined based on a difference between the final simulated product and the second product.

A method for determining a value a consumer places on a desired product component, in accordance with an exemplary embodiment, includes providing a first product that does not contain the desired product component and a second product that does contain the desired product component. A series of simulated products are then created, initially based on the first product, by sequentially eliminating an impact of one or more product components that are not the desired product component. A final simulated product is compared to the second product; and the value is determined based on a difference between the final simulated product and the second product.

In addition to the aspects and embodiments of the present invention described in this summary, further aspects and embodiments of the invention will become apparent by reference to the drawings and by reading the detailed description that follows.

BRIEF DESCRIPTION OF THE DRAWINGS

FIG. 1 is a screen shot of a web page allowing for the adjustment of weights;

DETAILED DESCRIPTION

Figure 2:
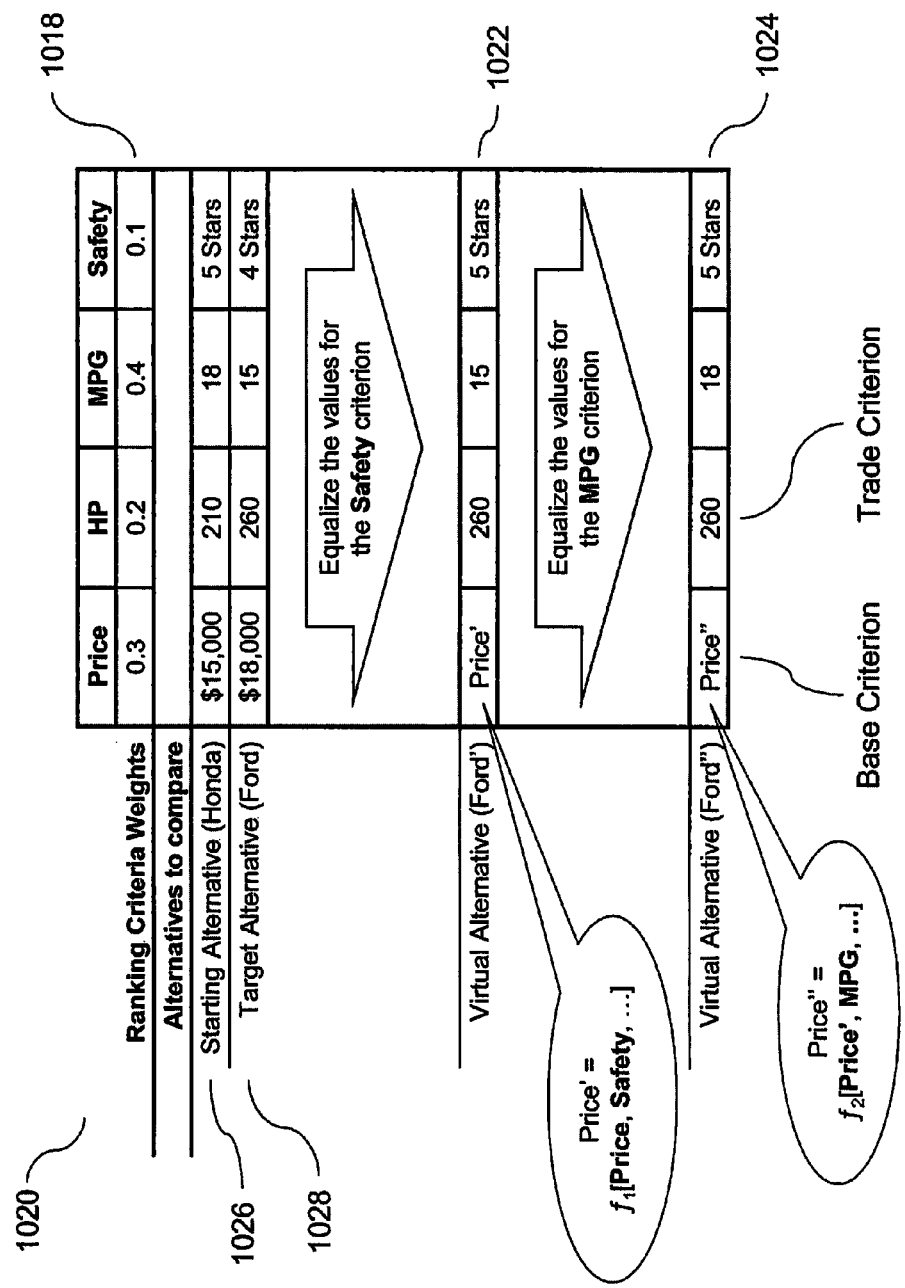
FIG. 2 is a chart illustrating a processed utilized by an analytical tool, in accordance with an exemplary embodiment.

An aspect of the present invention contemplates a variety of methods, systems and data structures for determining a singular impact of a tradeoff or criterion. An analysis system atically eliminates the effect of individual non-changed criteria in order to see what happens if a particular criteria is modified. What results is the individual or singular impact of adjusting that particular criterion. Other aspects are also within the scope of the present invention. In terms of this disclosure, "singular" can refer to either one item or to a group of items that are linked in some manner. Additionally, "singular" can also refer to a subcomponent of any economic unit that is capable of being sold.

FIG. 1 is a screen shot of a web page allowing for the adjustment of weights. In FIG. 1, a weight adjustment interface 92 lists a number of properties including a space property 94, a performance property 96, a safety property 98, a gas mileage property 100, a maintenance cost property 102, a comfort property 104, and a price property 106. Associated with each of these properties is a "slider bar" 112 including a diamond shaped indicator 110 (in this example) which can be adjusted in position along the length of the slider bar, as will be appreciated by those skilled in the art. In a typical interface, a pointer 108 controlled, for example, by a pointing device of a computer system (pointing device and computer not shown), is used to engage an indicator 110 and to drag to a desired position between the "not important" and the "very important" ends of the slider bar 112. The making and use of slider bars is well known to those skilled in the art. The position of the indicator 110 along the slider bar 112 is translated into a numeric output, typically a normalized value between zero and one, which is the weight for the criterion.

In practice, the user input is processed as indicated by the arrow 114 to provide an ordered or ranked list 116 which reflects the preferences of the user. As can be seen in the illustration of FIG. 1, the Ford Focus ZX3 coupe had the best overall score and was ranked #1 based upon the weighted preferences that were input in the weight adjustment section of screen shot 90. This was followed by the Ford Escape TWD Sport Utility 4D, which was ranked #2, the Ford Taurus SE V6 Wagon 4D, ranked at #3, etc.

FIG. 2 is a chart illustrating a process utilized by an analytical tool, in accordance with an exemplary embodiment. Chart 1020 shows two alternatives from a list ranked according to the weights shown in row 1018. Included in chart 1020 and row 1018 are a plurality of criteria/tradeoffs that include price, horsepower (HP), mileage (MPG) and safety. The analytic tool calculates singular tradeoffs between two criteria by progressively eliminating the contributions of all other criteria according to the weights shown in row 1018. This elimination process is carried out through elimination of intermediate "equivalent" alternatives weighting the base criterion relative to the other criteria. FIG. 2 shows two such, 1022, and 1024, used to eliminate the contribution of the safety and mileage criteria, respectively.

In a hypothetical situation, a Ford Honda motor company would like to determine how much a consumer is willing to pay per horsepower to go from 210 h.p. (the Honda's) to 260 h.p. (the Ford's). Again, it should be understood that the value the consumer is willing to pay per h.p. increase is being determined and not the actual cost to manufacture for the increase. To determine this perceived value, Honda compares their model to the Ford model that already has the desired feature—the increased H. P. The algorithm first marks the Ford as the target alternative 1028 and the Honda as the starting alternative 1026. Then, the target alternative 1028 is converted to the modified virtual alternative 1024, through virtual alternative 1022 using the weights shown in row 1018, so that the virtual alternative 1024 differs from the target alternative 1026 only in price and horsepower. One can then obtain the price that the consumer is willing to pay per additional horsepower from a ratio between the price difference and the horsepower difference for alternative 1026 and 1024. This price is referred to in this document as the singular impact of a tradeoff. The elimination process will be explained in more detail, subsequently.

It is important to note that, although the algorithm is typically used for price/feature singular impact tradeoff calculations, it is generic, and can apply just as well to situations where a tradeoff between two features is desired (for example, horsepower versus mileage). The inputs to the algorithm are as follows:

The criterion to be marked as the base criterion; in the example of FIG. 2, this is the horsepower.

The criterion to be marked as the trade criterion; in the example of FIG. 2, this is the price.

The target alternative; in the example of FIG. 2, this is the Ford (1028).

The starting alternative; in the example of FIG. 2, this is the Honda (1026).

Given this set of input directives the algorithm modifies the values of criteria in the starting alternative so that they match the values in the target alternative. The value for the base criterion is left unmodified, and that for the trade criterion is changed depending on the weighted values of other criteria, as described later. The end result is a virtual alternative that differs from the target in just the values of the base and trade criteria according to the weights of other criteria.

It should be further noted that the target alternative is usually the preferred choice while the starting alternative is the less preferred choice. It should also be further noted that the trade, in the preceding example, is the price which takes the form of a unit of currency. However, the criteria marked as the trade and the base can be any criteria related to a product that can be adjusted or added on. With that in mind, it is quite clear that, while the preceding example uses automobile related criteria, any economic unit capable of being sold that has subcomponents can be substituted.

Some further embodiments can take the form of, but are certainly not limited to, a consumer electronics manufacturer that is planning a new digital camera model, whose target price has been fixed by market considerations within a restricted range. In this situation, the interesting information is not how much real currency end users would be willing to pay for this or that feature, but rather how much of a feature they are willing to forego in order to get more of another. The algorithms effectively convert one of the two features into a virtual unit of currency, which is then exchanged for the other feature. In the case of the digital camera, the designers may want to determine the tradeoff between the lens quality and the digitization speed of the sensor. Depending on how much quality the end user is willing to give up for the ability to take consecutive pictures as quickly as possible, the answer will suggest whether to include more expensive optics, or put more money into a larger acquisition buffer.

Yet another embodiment could be a cable broadcast company that wants to introduce a new package that contains strong parental control features. In this case, the economic unit is not a hard good, but rather a soft service. Assuming that, just as for the digital camera, the price has been fixed by market considerations, then the interesting information is how the added parental control features stack up against, say, the width and breadth of the channel offering. In other words, how much "channel selection dollars" are end users willing to "pay" in order to have those new parental control features? The various algorithms employed in this disclosure can answer such questions.

Figure 3:
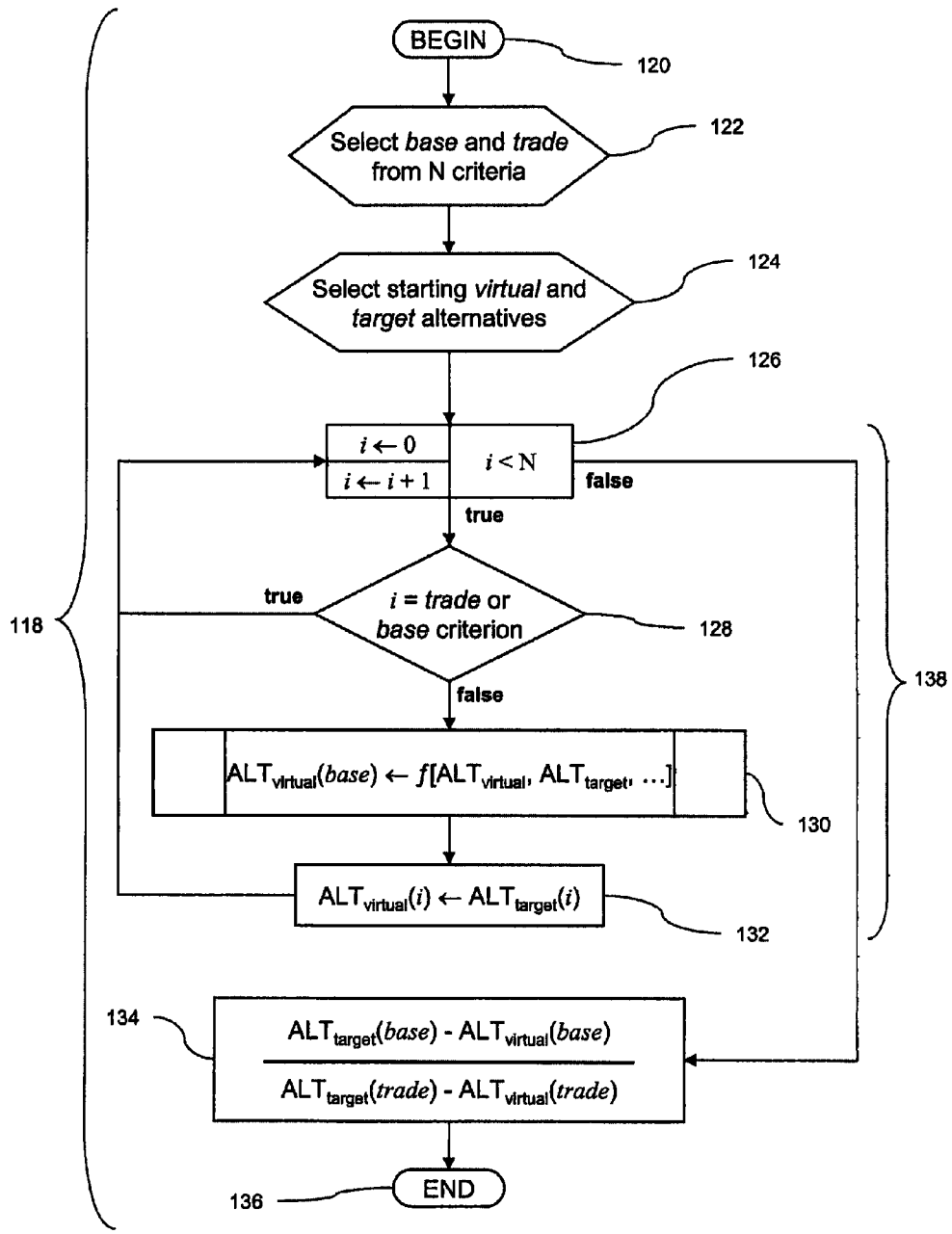
FIG. 3 is a flowchart illustrating a process of an analytical tool for determining a singular impact of a tradeoff, in accordance with an embodiment of the present invention.

The process of eliminating the impact of each criterion will now be explained. FIG. 3 is a flowchart illustrating a process 118 of an analytical tool for determining a singular impact of a tradeoff, in accordance with an exemplary embodiment. The process begins at 120 and in an operation 122, the base and trade criteria are selected out of the N available criteria. In the preceding example, the base criterion is the horsepower, the trade criterion the price, and N is equal to 4 (for price, horsepower, mileage, and safety). In an operation 124, the starting virtual alternative and the target alternative are selected; in the preceding example, the starting virtual alternative is the Ford, and the target alternative the Honda. An iterative loop 126 is then commenced with a counter beginning at 0, incrementing by 1, and looping as long as it is smaller than N; this counter is also an index into the array of criteria. Next, in an operation 128 it is decided if the counter corresponds to the index of the base or tradeoff criteria; if it is, then the rest of the loop body is skipped and control is passed back to operation 126. If the counter corresponds to neither the base nor the trade criterion, then operations 130 and 132 are executed to generate a new virtual alternative.

Operation 130 analyzes the current values for the target and virtual alternatives, and, in this example, applies a customizable, and possibly criterion-specific, algorithm to change the value of the base criterion to account for the fact that operation 132 sets the value of the current criterion in the virtual alternative to be the same as in the target alternative. Therefore, the two operations 130 and 132 generate a virtual alternative where the value of the current criterion is identical to the corresponding one in the target alternative, and the value of the base criterion has been adjusted to account for the change in the current criterion. Operations 130 and 132 eliminate the impact of the current criterion from the alternative.

Finally, it can be appreciated that, by looping through, the impact of each criterion is eliminated until just the impact of the trade criterion is left and is finally calculated at operation 134 by dividing the difference between the values of the base criteria for the target and final virtual alternatives by the difference between the values of the trade criteria for the same alternatives. Process 118 then ends at operation 136.

The algorithm implemented by operation 130 has access to the current execution context of loop 138; this context includes, but is not limited to, the target alternative, the current virtual alternative, the base and trade criteria, and the current criterion as identified by the loop counter. In addition, process 118 has been provided with a list of operation 130 algorithms associated with the various criteria. Examples of such algorithms follow, using the setting of FIG. 3; note that this is by necessity not a complete list, since the algorithms applied in operation 130 may be highly dependent on the specific setting (for example, they may be highly dependent on the semantics of the trade and base criteria).

So, since the base and trade criteria are price and HP, respectively, operation 130 calculates the change in price that would correspond to change the mileage from 15 (the Ford's value) to 18 (the Honda's), or the safety from 4 stars (the Ford's) to 5 stars (the Honda's). As was discussed earlier, operation 130 may implement varied algorithms, of various complexities, tailored to each criterion's semantics. A simple algorithm may use singular impact of tradeoff values that were obtained via other means, such as focus groups or user surveys. For example, an organization may have already established that the typical end user is willing to pay up to $500 for a sunroof, and can use that information to eliminate the contribution of a sunroof when generating automobile-related virtual alternatives. Another algorithm may estimate the tradeoff value as a percentage of the cost of providing the given feature: for example, a digital camera manufacturer knows the additional price of producing a model with a 4 megapixel instead a 3 megapixel sensor, and estimates a user's tradeoff value to be 125% of that cost. Finally, complex algorithms may use information like the end-user's tradeoff preferences (the weights used for the ranking) to estimate the percentage of a total price difference to allocate to the adjustment for a specific criterion.

Figure 4A:
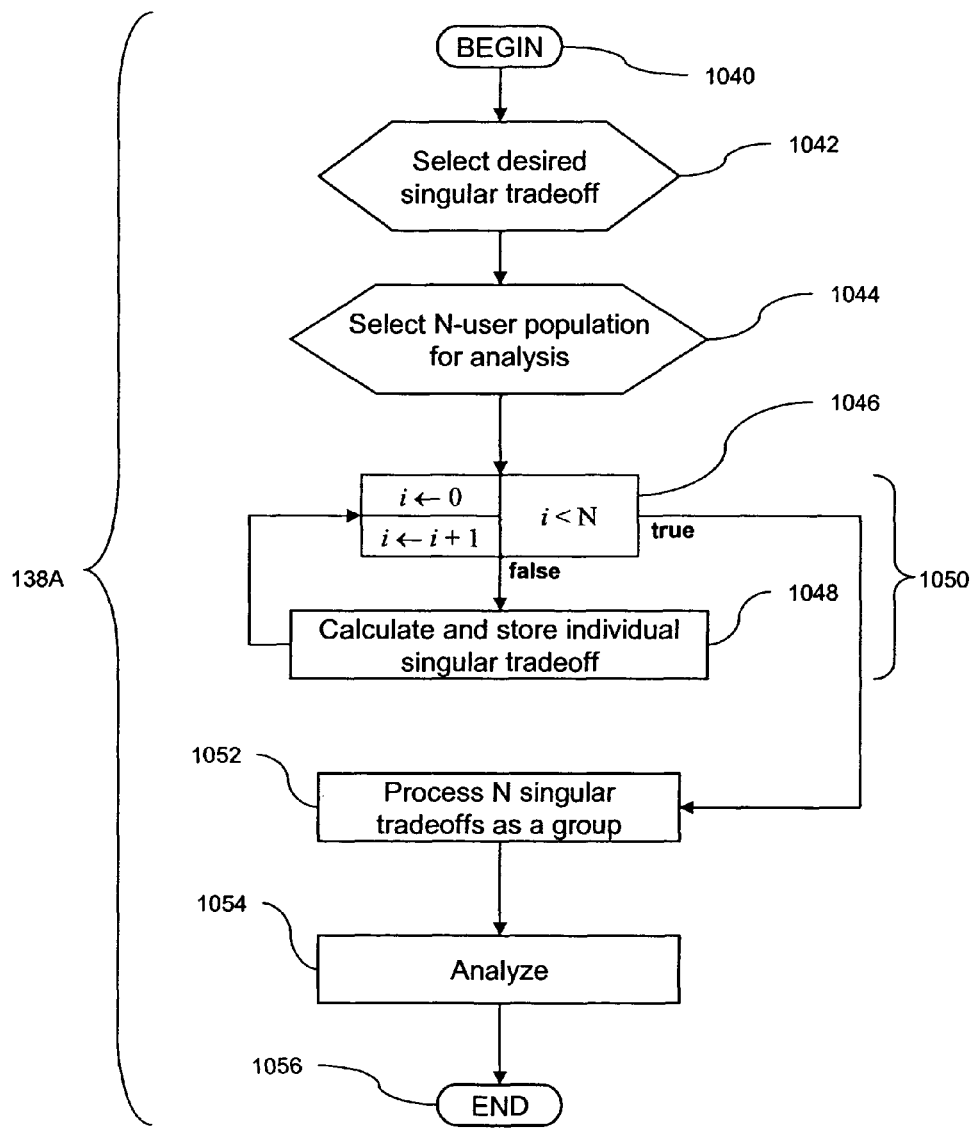
FIG. 4A is a flowchart illustrating a process for analyzing an individual singular tradeoff for a population of users, in accordance with an exemplary embodiment.
Figure 4B:
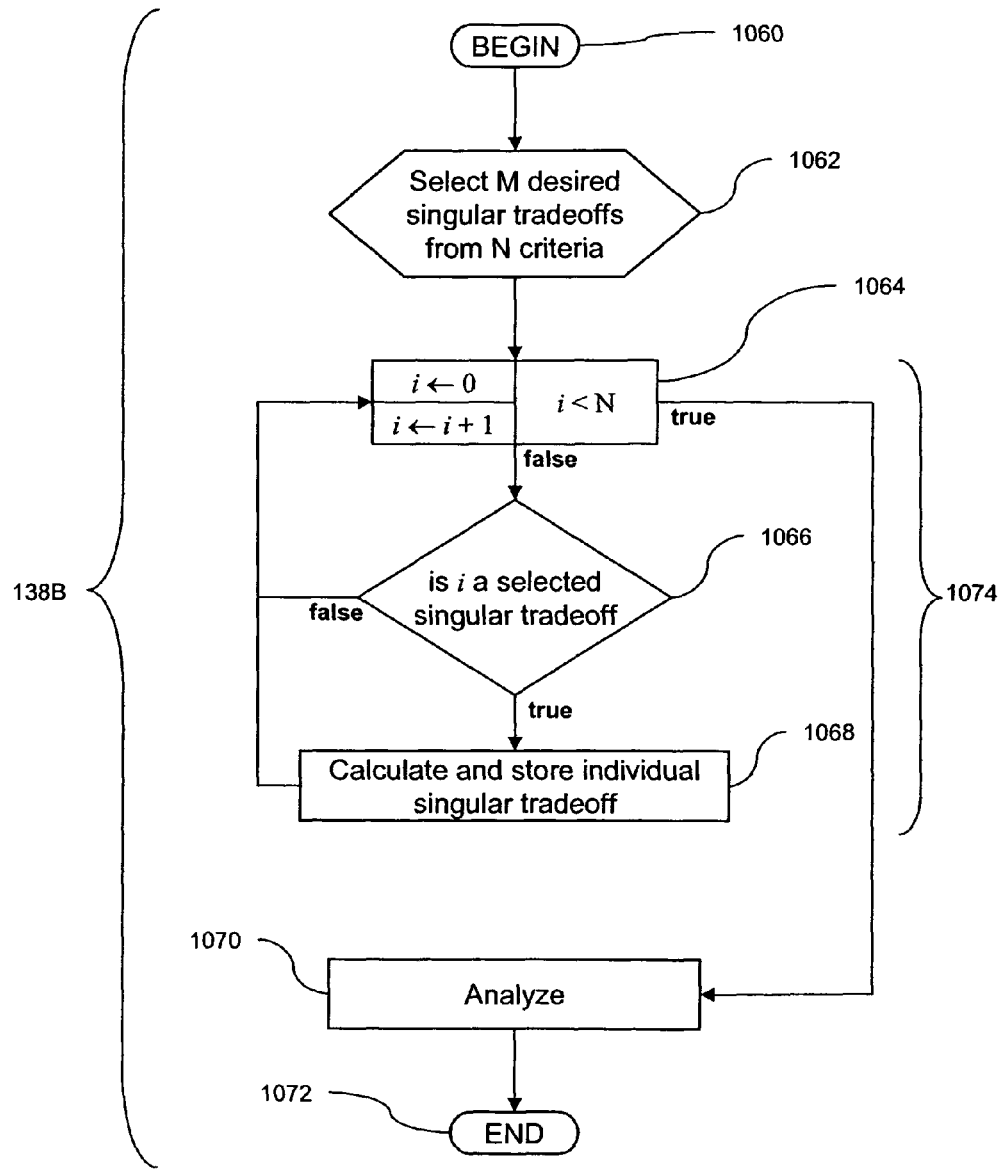
FIG. 4B is a flowchart illustrating a process for storing an individual tradeoff for each attribute, in accordance with an exemplary embodiment.

FIGS. 4A and 4B illustrate various, exemplary, but not limiting implementations of process 138. FIG. 4A is a flowchart illustrating a process 138A for analyzing a singular tradeoff from a population of users, in accordance with an exemplary embodiment. After a start operation 1040, the desired singular tradeoff and target user population are selected in operations 1042 and 1044, respectively; the population will contain N users. The loop operation 1046 sets a counter to 0, increases it by 1 with each iteration, and exits when the counter is greater than, or equal to, N. The individual singular tradeoff for user i is collected, in accordance with an embodiment of the present invention, and stored for later processing in operation 1048. This operation embeds the analytic engine described in FIG. 3. Once all singular tradeoffs have been collected, they are processed as a group, for example by calculating the average, or with other statistical techniques, in operation 1052. Finally, the processed singular tradeoffs are used for analysis in operation 1054. The process 138A is then completed at operation 1056.

FIG. 4B is a flowchart illustrating a process 138B for storing an individual singular tradeoff for a set of attributes, in accordance an exemplary embodiment. After a start operation 1060, operation 1062 selects M from N possible attributes for calculation of singular tradeoffs. The loop operation 1064 sets a counter to 0, increases it by 1 with each iteration, and exits when the counter is greater than, or equal to, N. Operation 1066 checks if the criterion at counter i is one of the M selected criteria. If so, operation 1068 calculates the singular tradeoff, in accordance with an embodiment of the present invention, and stores for use by operation 1070; otherwise, control is returned to operation 1064. When all criteria have been processed, operation 1070 performs the desired analyses on the collection of singular tradeoffs. Operation 1072 then ends process 138A.

Figure 5:
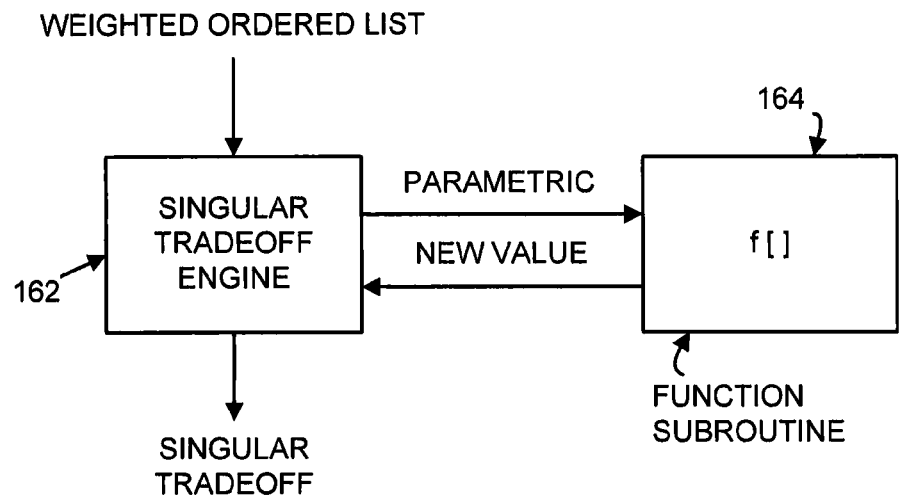
FIG. 5 is a block diagram of an analytical tool system, in accordance with an exemplary embodiment.

FIG. 5 is a block diagram of an analytical tool system 160, in accordance with an exemplary embodiment. Included in system 160 is a singular tradeoff engine 162 and a function subroutine engine 164. Singular tradeoff engine 162 accepts as input a weighted ordered list and produces a singular tradeoff in conjunction with function subroutine engine 164. This occurs by exchanging parametric values from the singular tradeoff engine 162 to the function subroutine 164. In response, the function subroutine engine 162 sends a new value to the singular tradeoff engine 162. The system 160, for example, can be implemented on a computer system using software to perform processes such as those described above. Alternatively, the system 160 can be implemented in hardware, software or any combination thereof. The engines 160 and 164 can operate on any principle including digital, analog and other computing modalities.

Figure 6:
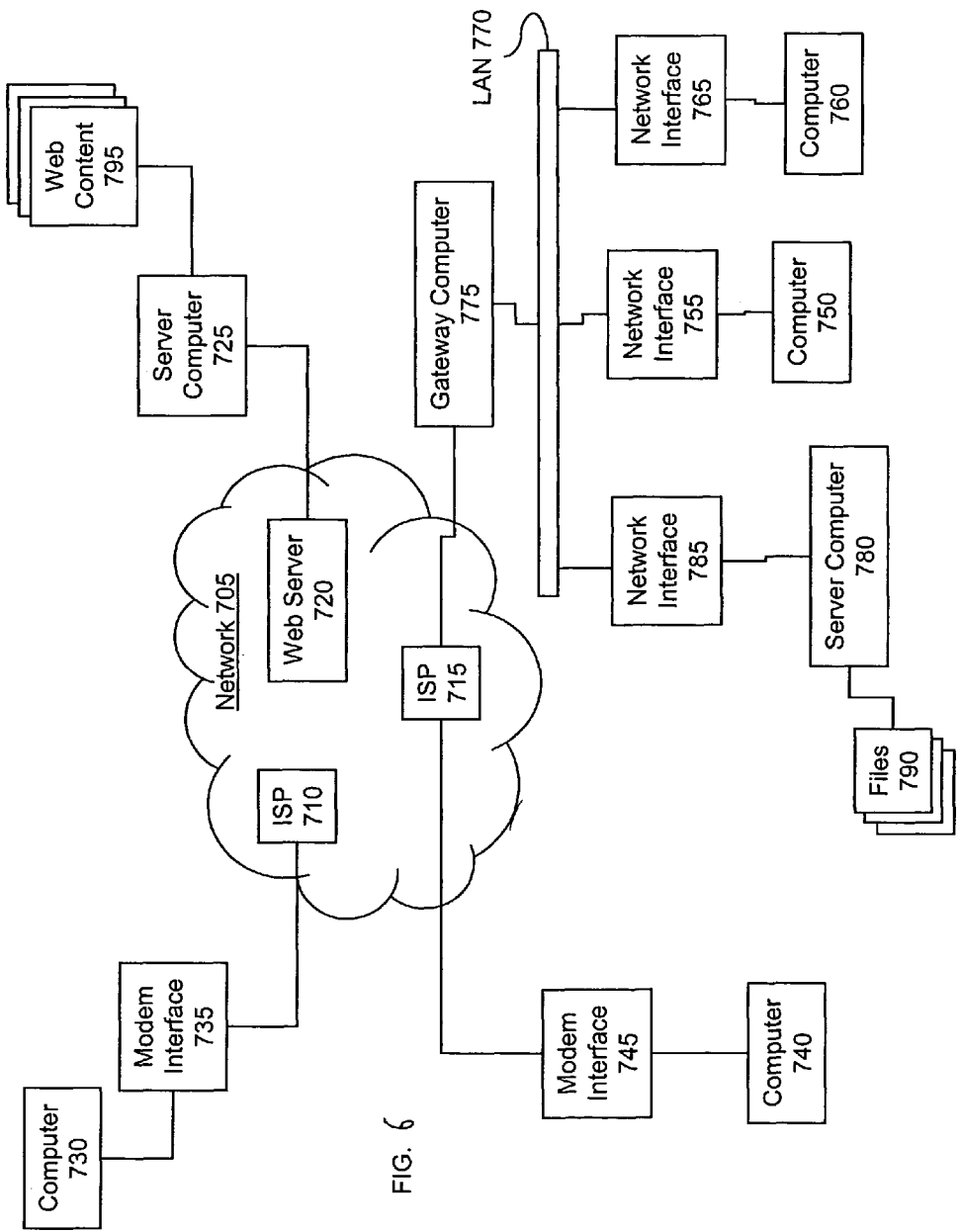
FIG. 6 is a block diagram of an exemplary embodiment of a network.
Figure 7:
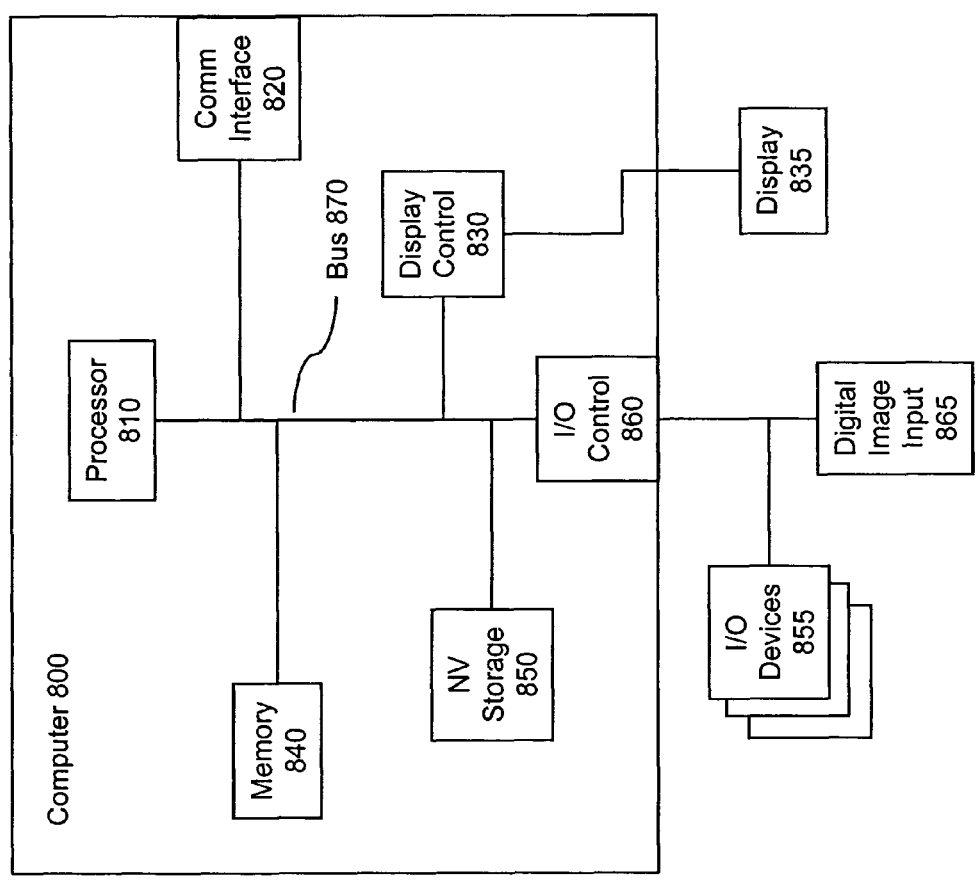
FIG. 7 is a block diagram of an exemplary embodiment of a computer.

The following description of FIGS. 6-7 is intended to provide an overview of computer hardware and other operating components suitable for performing the methods of the invention described above, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 6 is a block diagram of an exemplary embodiment of a network 705, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art.

Access to the Internet 705 is typically provided by Internet service providers (ISP), such as the ISPs 710 and 715. Users on client systems, such as client computer systems 730, 740, 750, and 760 obtain access to the Internet through the Internet service providers, such as ISPs 710 and 715. Access to the Internet allows users of the client computer systems to exchange information, receive and send e-mails, and view documents, such as documents which have been prepared in the HTML format. These documents are often provided by web servers, such as web server 720 which is considered to be "on" the Internet. Often these web servers are provided by the ISPs, such as ISP 710, although a computer system can be set up and connected to the Internet without that system also being an ISP.

The web server 720 is typically at least one computer system which operates as a server computer system and is configured to operate with the protocols of the World Wide Web and is coupled to the Internet. Optionally, the web server 720 can be part of an ISP which provides access to the Internet for client systems. The web server 720 is shown coupled to the server computer system 725 which itself is coupled to web content 795, which can be considered a form of a media database. While two computer systems 720 and 725 are shown in FIG. 6, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides Internet connectivity to the client computer system 730 through the modem interface 735 which can be considered part of the client computer system 730. The client computer system can be a personal computer system, a network computer, a Web TV system, or other such computer system.

Similarly, the ISP 715 provides Internet connectivity for client systems 740, 750, and 760, although as shown in FIG. 6, the connections are not the same for these three computer systems. Client computer system 740 is coupled through a modem interface 745 while client computer systems 750 and 760 are part of a LAN. While FIG. 6 shows the interfaces 735 and 745 as generically as a "modem," each of these interfaces can be an analog modem, ISDN modem, cable modem, satellite transmission interface (e.g. "Direct PC"), or other interfaces for coupling a computer system to other computer systems.

Client computer systems 750 and 760 may be coupled to a LAN 770 through network interfaces 755 and 765, which can be Ethernet network or other network interfaces. The LAN 770 is also coupled to a gateway computer system 775 which can provide firewall and other Internet related services for the local area network. This gateway computer system 775 is coupled to the ISP 715 to provide Internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the Internet through the gateway system 775.

FIG. 7 is a block diagram of an exemplary embodiment of a computer that can be used as a client computer system or a server computer system or as a web server system. Such a computer system can be used to perform many of the functions of an Internet service provider, such as ISP 710. The computer system 800 interfaces to external systems through the modem or network interface 820. It will be appreciated that the modem or network interface 820 can be considered to be part of the computer system 800. This interface 820 can be an analog modem, ISDN modem, cable modem, token ring interface, satellite transmission interface (e.g. "Direct PC"), or other interfaces for coupling a computer system to other computer systems.

The computer system 800 includes a processor 810, which can be a conventional microprocessor such as an Intel Pentium microprocessor or Motorola Power PC microprocessor. Memory 840 is coupled to the processor 810 by a bus 870. Memory 840 can be dynamic random access memory (DRAM) and can also include static RAM (SRAM). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an I/O controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to this embodiment, but it may lack some of the features shown in FIG. 6, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows (from Microsoft Corporation of Redmond, Wash., and their associated file management systems. Another example of an operating system software with its associated file management system software is the LINUX operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar typically electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to apparatus for performing the operations herein. This apparatus may be specially constructed for the required purposes, or it may comprise a general purpose computer selectively activated or reconfigured by a computer program stored in the computer. Such a computer program may be stored (embodied) in a computer (machine) readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

While this invention has been described in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention.

What is claimed is:

1. A computer implemented method for determining a singular impact of a base criterion on a product comprising:
   receiving, at a server computing system, an instruction selecting the base criterion and a different trade criterion from a plurality of criteria, the plurality of criteria selected from criteria for the product;
   receiving, at the server computing system, an instruction selecting a starting alternative and a target alternative;
   receiving, at the server computing system, a plurality of criteria weights including a weight for each of the plurality of criterion for the product, each criteria weight indicating a relative importance of the product criteria in a trade-off decision relative to the importance of different other ones of the plurality of product criteria;
   at the server computing system, creating a series of virtual alternatives, initially based on the starting alternative, by sequentially eliminating an impact of each non-selected criteria from the plurality of criteria, the impact being eliminated by equalizing the values for each of the non-selected criteria;
   at the server computing system, comparing a final virtual alternative having the impact of each non-selected criteria eliminated to the target alternative; and at the server computing system, determining, the singular impact of the base criterion based on a difference between the final virtual alternative and the target alternative;

wherein the base criterion is weighted using a base criterion weight that is multiplied by the base criterion value to generate a weighted base criterion and other criterion are weighted by other criterion weights to reflect a user's preference for the base criterion relative to other criteria.

2. The method as recited in claim 1 wherein the plurality of criteria are subcomponents of an economic unit capable of being sold.

3. The method as recited in claim 2 wherein the economic unit comprises the starting alternative and the target alternative.

4. The method as recited in claim 1 wherein the singular impact of the base criterion is a unit of currency per the base criterion.

5. The method as in claim 1, wherein each of the criteria weights identify a relative importance between the various different criteria for the product and not a preference within the same product criteria.

6. The method as in claim 1, wherein the method further comprising:
selecting the base criterion and the different trade criterion from the plurality of criteria.

7. The method as in claim 1, wherein the method further comprising:
selecting the starting alternative and the target alternative.

8. The method as in claim 1, wherein the product comprises an item for purchase.

9. The method as in claim 1, wherein the product comprises a service.

10. The method as in claim 1, wherein the steps of creating, comparing, and determining includes making at least one trade-off comparison of the relative importance of a plurality of the criteria alternatives of the product.

11. The method as in claim 1, wherein the steps of creating, comparing, and determining includes making at least one trade-off comparison of the relative importance of all or the plurality of the criteria alternatives of the product.

12. The method as in claim 1, wherein the method includes comparing at least two criteria and characterizing how the change of a first criteria can be offset by a change in a second criteria by eliminating the impact of all other criteria based on a user tradeoffs.

13. The method as in claim 12, wherein the first criteria is the base criteria and the second criteria is the trade criteria.

14. The method as in claim 1, wherein the different relative weights indicate the relative importance for a user's tradeoff between product criteria.

15. The method as in claim 1, wherein the virtual alternatives created are not limited to physical economical units capable of being sold and purchased and includes virtual or hypothetical products having a virtual or hypothetical product criteria that has a criteria of a different physical product.

16. A computer implemented method for determining a singular impact of a base criterion comprising:
receiving, at a server computing system, an instruction selecting the base criterion and a different trade criterion from a plurality of criteria, the plurality of criteria selected from criteria for a product;
receiving, at a server computing system, an instruction selecting a starting alternative and a target alternative;
receiving, at the server computing system, a plurality of criteria weights including a weight for each of the plurality of criterion for the product, each criteria weight indicating a relative importance of the product criteria in a trade-off decision relative to the importance of different other ones of the plurality of product criteria;
creating, at the server computing system, a series of virtual alternatives, initially based on the starting alternative, by sequentially eliminating an impact of each non-selected criteria from the plurality of criteria, the impact being eliminated by equalizing the values for each of the non-selected criteria;
comparing, at the server computing system, a virtual alternative of the series of virtual alternatives to the target alternative wherein the virtual alternative only differs from the target alternative by a value of the base criterion; and
determining, by the server computing system, the singular impact of the base criterion based on a difference between the final virtual alternative and the target alternative;
wherein the base criterion is weighted using a base criterion weight that is multiplied by the base criterion value to generate a weighted base criterion and other criterion are weighted by other criterion weights to reflect a user's preference for the base criterion relative to other criteria.

17. The method as recited in claim 16 wherein the plurality of criteria are subcomponents of an economic unit capable of being sold.

18. The method as recited in claim 17 wherein the economic unit comprises the starting alternative and the target alternative.

19. The method as recited in claim 16 wherein the singular impact of the base criterion is a unit of currency per the base criterion.

20. A computer implemented method for determining a singular impact of a base criterion comprising:
receiving, at a server computing system, an instruction selecting the base criterion and a trade criterion from N criteria; wherein the N criteria are available from a product;
receiving, at the server computing system, an instruction selecting a starting alternative and a target alternative;
creating N−2 sequential virtual alternatives, initially based on the starting alternative, by sequentially eliminating an impact of each non-selected criteria from the N criteria;
comparing a virtual alternative of the series of virtual alternatives to the target alternative wherein the virtual alternative only differs from the target alternative by a value of the base criterion; and
determining, by the server computing system, the singular impact of the base criterion based on a difference between the final virtual alternative and the target alternative;
wherein the base criterion is weighted using a base criterion weight that is multiplied by the base criterion value to generate a weighted base criterion and other criterion are weighted by other criterion weights to reflect a user's preference for the base criterion relative to other criteria.

21. The method as recited in claim 20 wherein the N available criteria are subcomponents of an economic unit capable of being sold.

22. The method as recited in claim 21 wherein the economic unit comprises the starting alternative and the target alternative.

23. The method as recited in claim 20 wherein the singular impact of the base criterion is a unit of currency per the base criterion.

24. The computer implemented method as in claim 20, wherein the method further comprises:
- selecting the base criterion and a trade criterion from N criteria; and
- selecting the starting alternative and the target alternative.

25. A method for analyzing an impact of a desired singular tradeoff for a population of users comprising:
- receiving, at a server computing system, an instruction selecting the desired singular tradeoff from the population of users;
- collecting, at the server computing system, a plurality of singular tradeoffs in a sequential fashion from the population of users;
- collecting, at the server computing system, a plurality of weights including a weight for each of the plurality of tradeoffs, each weight indicating a relative importance of the tradeoff in a trade-off decision relative to the importance of different other ones of the plurality of tradeoffs;
- processing the plurality of singular tradeoffs, including weighting the tradeoffs using the tradeoff weights;
- analyzing the plurality of singular tradeoffs; and
- determining, by the server computing system, the impact of the desired singular tradeoff based on the analyzed plurality of tradeoffs;
- wherein a base criterion tradeoff is weighted using a base tradeoff weight that is multiplied by the base tradeoff value to generate a weighted base tradeoff and other tradeoffs are weighted by other tradeoff weights to reflect a user's preference for the base tradeoff relative to other tradeoffs.

26. The method as recited in claim 25 wherein the plurality of singular tradeoffs are subcomponents of an economic unit capable of being sold.

27. The method as recited in claim 26 wherein the economic unit is a plurality of economic units comprising the population of users.

28. The method as recited in claim 25 wherein the impact of the desired singular tradeoff is a unit of currency per the desired singular tradeoff.

29. A system for determining a singular impact of a base criterion comprising:
- a processor;
- a computer readable medium coupled to the processor storing instructions executable by a processor, the instructions defining:
  - a singular tradeoff engine that accepts a weighted ordered list and operative to determine a singular impact of a base criterion by creating virtual alternatives based on the weighted ordered list; and
  - a function subroutine engine that accepts parametric values from the singular tradeoff engine and operative to develop a new value to the singular tradeoff engine;
- wherein the base criterion is weighted using a base criterion weight that is multiplied by the base criterion value to generate a weighted base criterion and other criterion are weighted by other criterion weights to reflect a user's preference for the base criterion relative to the criteria selected from the product.

30. The system as recited in claim 29 wherein the weighted ordered list comprises subcomponents of an economic unit capable of being sold.

31. The system as recited in claim 30 wherein the economic unit is a plurality of economic units and the virtual alternatives are created based on the plurality of economic units.

32. The system as recited in claim 29 wherein the singular impact of a base criterion is a unit of currency per the base criterion.

33. A method for determining a value a consumer places on a desired product component comprising:
- receiving, at a server computing system, a transmission providing a first product that does not contain the desired product component and a second product that does contain the desired product component;
- creating a series of simulated products, initially based on the first product, by sequentially eliminating an impact of one or more product components that are not the desired product component;
- comparing a final simulated product to the second product;
- determining, by the server computing system, the value based on a difference between the final simulated product and the second product; and
- wherein the desired product component is weighted using a desired product component weight that is multiplied by the desired product component value to generate a weighted desired product component and other product components are weighted by other product component weights to reflect a user's preference for the desired product component relative to the one or more product components.

34. The method as recited in claim 33, wherein the method further comprises:
- prior to receiving said transmission, identifying said first product that does not contain the desired product component and said second product that does contain the desired product component.

35. The method as recited in claim 33 wherein the value comprises a monetary unit per the desired product component.

* * * * *